United States Patent [19]

Wheeler

[11] 4,110,790
[45] Aug. 29, 1978

[54] VIDEO PROCESSING SYSTEM PROVIDING GAIN CONTROL, APERTURE CONTROL, AND BLACK LEVEL CONTROL

[75] Inventor: Robert C. Wheeler, Elba, N.Y.

[73] Assignee: GTE Sylvania Incorporated, Stamford, Conn.

[21] Appl. No.: 760,284

[22] Filed: Jan. 19, 1977

[51] Int. Cl.² .................. H04N 5/14; H04N 5/18; H04N 5/52

[52] U.S. Cl. .................. 358/162; 358/172; 358/174

[58] Field of Search ............ 358/160, 162, 171, 167, 358/169, 172, 174

[56] References Cited

U.S. PATENT DOCUMENTS

| 3,569,620 | 3/1971 | Baun | 358/174 X |
| 3,928,867 | 12/1975 | Lynch | 358/169 X |
| 4,030,125 | 6/1977 | Bedell et al. | 358/169 |

*Primary Examiner*—John C. Martin
*Assistant Examiner*—Aristotelis M. Psitos

*Attorney, Agent, or Firm*—Theodore D. Lindgren

[57] ABSTRACT

A video processing system for a television receiver is shown. The video processing system includes a gain controlled stage through which a video signal is coupled. The gain of the stage is controlled to provide contrast control of the video signal. The video signal is also applied to an aperture correction circuit which develops an aperture correction signal including pre-shoot and over-shoot transient responses. The aperture correction signal is also coupled through the gain controlled stage so that it is amplified or attenuated by the same amount as the video signal. The output of the gain controlled stage is coupled to an output stage. A portion of the video signal from the output stage is compared to a reference voltage in a black level control circuit. The control signal from the black level control circuit is applied to the output stage to control the black level of the video signal. The disclosed video processing system is further adapted for fabrication in integrated circuit form.

15 Claims, 7 Drawing Figures

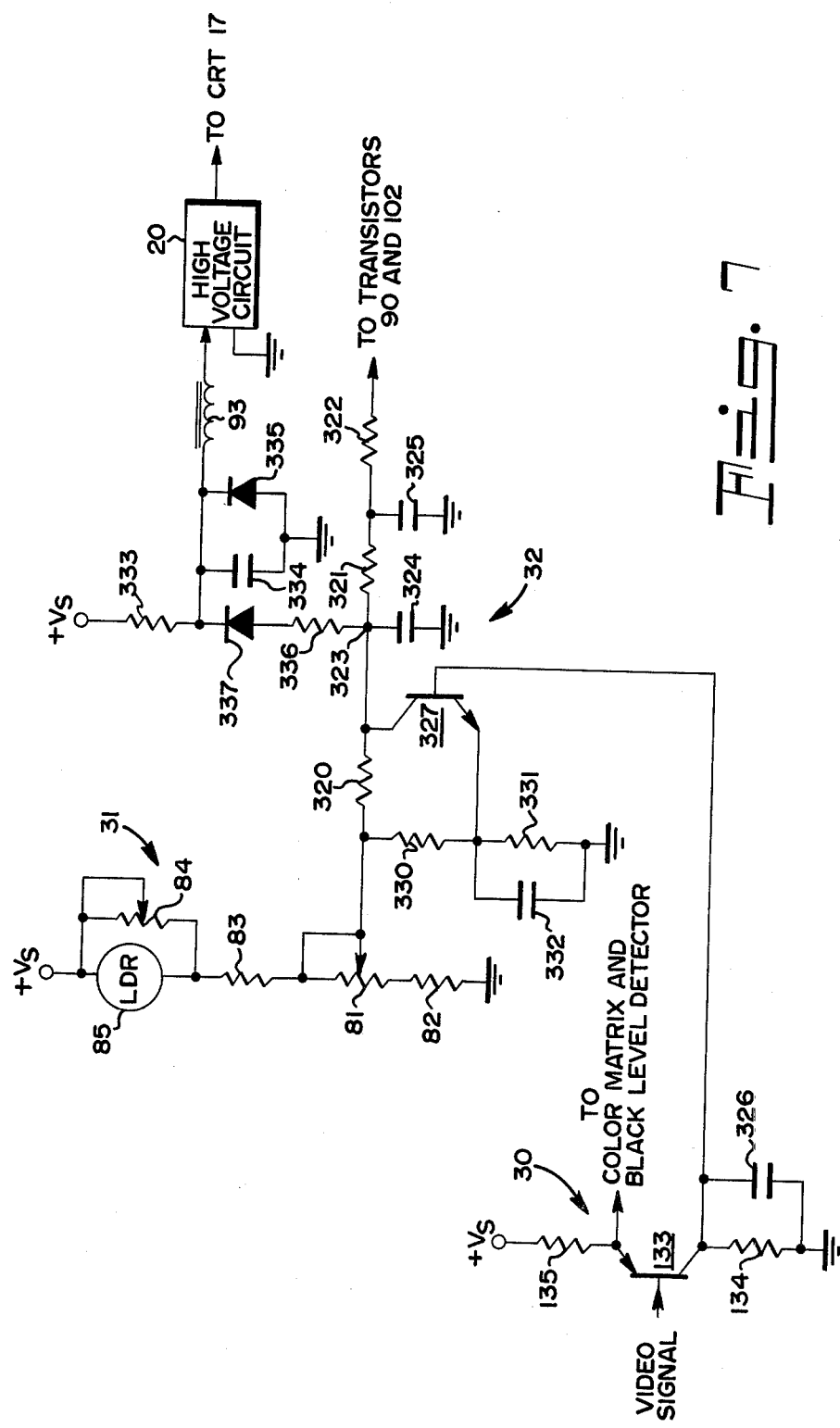

VIDEO PROCESSING SYSTEM PROVIDING GAIN CONTROL, APERTURE CONTROL, AND BLACK LEVEL CONTROL

CROSS-REFERENCE TO RELATED APPLICATIONS

K. J. Burdick et al., "Automatic Peaking Control Circuitry For A Video Processing System," Ser. No. 760,366, filed Jan. 19, 1977; R. C. Wheeler, "Aperture Correction Circuitry For A Video Processing System," Ser. No. 760,283, filed Jan. 19, 1977; A. H. Klein, "Blanking Circuitry For A Television Receiver Video System," Ser. No. 760,364, filed Jan. 19, 1977; R. C. Wheeler, "Contrast Control Circuitry For A Video Processing System," Ser. No. 760,361, filed Jan. 19, 1977; all filed the same date and assigned to the same assignee as this application.

G. K. Srivastava and R. C. Wheeler, "Adjustable Aperture Correction System," Ser. No. 573,057, filed Apr. 30, 1975; D. W. Constable, "Ambient Light Contrast and Color Control Circuit," Ser. No. 689,997, filed May 26, 1976; both assigned to the same assignee as this application.

FIELD OF THE INVENTION

This invention relates to a video processing system for television receivers and more particularly to a video processing system including contrast control, aperture correction, and black level control of the video signal.

BACKGROUND OF THE INVENTION

Composite video signals of the type used in television systems include video and synchronizing information. The video information is divided into sequential trace and retrace signals with the synchronizing information transmitted as pulses during the retrace portion of the video information. During the trace interval, the video signal varies between black and white levels. The retrace interval video signal includes a blanking portion which is at or slightly greater than black level so that the electron beam in the cathode ray tube (CRT) is turned off during retrace. If all of the levels of the various components of the video signal are properly adjusted at the studio and properly transmitted and received, the video signals can be properly displayed on a CRT screen. Unfortunately, adjustment errors and transmitting and receiving errors require processing and correction of the video signal to achieve a satisfactorily displayed image.

Some of the more common errors in the received signal include improper black and white levels and improper synchronizing pulse amplitude. Since the automatic gain control in typical television receivers sets-up on the synchronizing pulse amplitude, improper synchronizing pulse amplitude can cause the received signal to be amplified more or less than desired. If the black level of the trace interval signal is set improperly with respect to the blanking level, the displayed image will be too dark or too light depending upon the direction of the error. Similarly, an improperly set white level will result in improper contrast assumming black level is set correctly. In typical television receivers, the contrast and brightness controls can be used to correct, at least in part, for such errors. Adjustments of the contrast and brightness control to correct erroneous composite video signals, however, cannot correct all errors and necessitates frequent readjustment to provide a properly displayed image.

The signals received by a television receiver are typically provided by a variety of sources each of which can have different errors in signal levels necessitating readjustment of the contrast and brightness controls to produce a properly displayed image. For example, when channels are changed, any signal level errors will necessarily be different. Also, on the same channel the signal may be provided by a variety of sources in the studio such as different cameras, video tape, movie film, and the like. Since each source can have its own unique characteristics, switching from one source to another can alter the signal levels. Compensation for the different signal levels of the various studio signal sources is generally incomplete. Accordingly, the composite video signal received by a television receiver may also include undesired variations in signal levels.

Prior art television receivers have included various forms of automatic control circuitry in an attempt to compensate for such undesired contrast and brightness variations. One prior art form of black level control includes the so-called "back porch clamp" which clamps the black level of the video signal to the blanking level. If the blank level of the video signal is improperly set with respect to the blanking level, however, this form of automatic black level control does not correct the signal properly.

Another form of automatic contrast and brightness control involves detecting and clamping to the blackest and whitest portions of the received signal. While such circuitry circumvents the primary disadvantages of back porch clamping, under some signal conditions the displayed image is improper. For example, on scenes where there is no black in the image, the control circuitry can improperly clamp to a portion of the image not intended to be black and cause those portions to be black. Similarly, in a dark scene with no white level signals intended, the lightest part of the image can be clamped to white level thereby distorting the intended and desired image. Control circuitry of ths type generally also requires peak detecting and sample and hold circuits. Since such circuits will tend to set-up on blanking interval signals, a blanking generator which anticipates the blanking intervals is necessary. Providing such circuitry requires substantial expense and circuit complexity for proper operation.

Other forms of automatic contrast and brightness control circuitry have been used; however, known prior art circuitry of this type, including the types mentioned above, has numerous deleterious effects. For example, the compensation for video signal errors can be incomplete or incorrect under varying signal conditions. Additionally, some forms of prior art circuitry are unduly complex and expensive or require compromises which deleteriously effect the displayed image.

Another form of video signal error which commonly occurs is degradation of the sharpness of the image. Numerous variations in picture sharpness and numerous causes for such variations are encountered in typical TV transmissions. Such variations can be caused, for example, by differing video signal transient characteristics of the various video signal sources used in the TV studio. Also, the video distribution systems used in the studio may have different video frequency response and group delay characteristics. Transmitters and modulators at different studios or stations also have different video frequency response and group delay characteristics. Multipath or ghost pick-up conditions at the receiving antenna can greatly vary detected video signal transient response due to signals being cancelled at some frequencies and reinforced at others. Additionally, the TV receiver radio frequency intermediate frequency, and video responses may vary from channel to channel. Factors other than those mentioned above may also cause variations to picture sharpness.

Two somewhat related forms of compensation for variations in picture sharpness are known in the prior art. One form is generally called video peaking which is a form of high frequency emphasis. Typical prior art video peaking circuits boost the high frequency components of the video signal. Such circuits also typically have an undesired phase delay associated therewith.

The term "aperture correction" is primarily used with cameras to refer to compensation for spot size. The term is also used in receivers to refer to a particular form of video peaking which does not have a phase delay associated therewith. Aperture correction involves the addition of pre-shoot and over-shoot components to transitions or transients in the video signal. Thus, the sharpness of the displayed image is enhanced by sharpening the transition from one brightness level to another brightness level.

While numerous forms of aperture correction and peaking circuitry are known in the prior art, such circuitry typically suffers from one or more disadvantages. Discrete aperture correction circuitry is typically simple to avoid expense but has less than optimum performance. Other known forms of aperture correction circuitry are unduly complex. In addition, known prior art aperture correction circuitry tends to emphasize noise thereby deleteriously affecting the weak signal performance of the television receiver. Accordingly, the expense, complexity, and deleterious performance of known prior art aperture correction circuitry has limited the utility of such circuitry.

OBJECTS OF THE INVENTION

Accordingly, it is a primary object of this invention to obviate the above noted and other disadvantages of the prior art.

It is a further object of this invention to provide a new and novel video processing system for television receivers.

It is a still further object of this invention to provide a video processing system with the capability of optimum correction of video signal errors.

It is a yet further object of this invention to provide a video processing system which incorporates aperture correction circuitry, contrast control circuitry, and black level control circuitry arranged for optimum correction of the video signal.

It is a further object of this invention to provide a video processing system with automatic contrast or white level control.

It is a still further object of this invention to provide a video processing system with automatic black level control.

It is a yet further object of this invention to provide a video processing system with automatic aperture correction control.

It is a yet further object of this invention to provide a video processing system suitable for fabrication in integrated circuit form.

It is a further object of this invention to provide a video processing system which includes common blanking and noise protection circuitry.

SUMMARY OF THE INVENTION

The above and other objects and advantages are achieved in one aspect of this invention by a video processing system for a television receiver including a gain controlled stage, aperture correction means, gain control means, an output stage, and black level control means. The gain controlled stage has a video signal input and a gain control input. Means for providing a video signal to the gain controlled stage is connected to the video signal input. The aperture correction means is connected to the means for providing a video signal and to the video signal input of the gain controlled stage for providing an aperture correction signal to the video signal input. The gain control means is connected to the gain control input of the gain controlled stage for providing a gain control signal thereto. The output stage is connected to the gain control stage for receiving a combined video signal and aperture correction signal therefrom. The black level control means is connected to the output stage for detecting the black level of the video signal provided by the output stage and for providing a control signal to the output stage in response to the detected black level.

In another aspect of this invention the above and other objects and advantages are achieved in a video processing system for a television receiver including a video amplifier, a blanking circuit, and comparing means. The video amplifier amplifies a video signal having video intervals and blanking intervals with the blanking intervals having a signal level corresponding to the black level of the video intervals. The blanking circuit provides blanking pulses during the blanking intervals of the video signal. The comparing means is connected to receive a reference voltage and a portion of the video signal from the video amplifier and is further connected to a control input of the video amplifier for providing a black level control signal to the control input in response to the relative amplitudes of the reference voltage and the portion of the video signal. Means connecting the blanking circuit to the comparing means disables the comparing means during the blanking intervals except for residual portions of the blanking intervals. The comparing means averages the residual portions of the blanking intervals with video signals occurring during the video intervals.

BRIEF DESCRIPTION OF THE DRAWINGS

FIG. 7 is a schematic diagram of a television receiver incorporating a preferred embodiment of the invention.

DETAILED DESCRIPTION OF THE PREFERRED EMBODIMENT

For a better understanding of the present invention, together with other and further objects, advantages and capabilities thereof, reference is made to the following disclosure in conjunction with the accompanying drawings.

Figure 1:
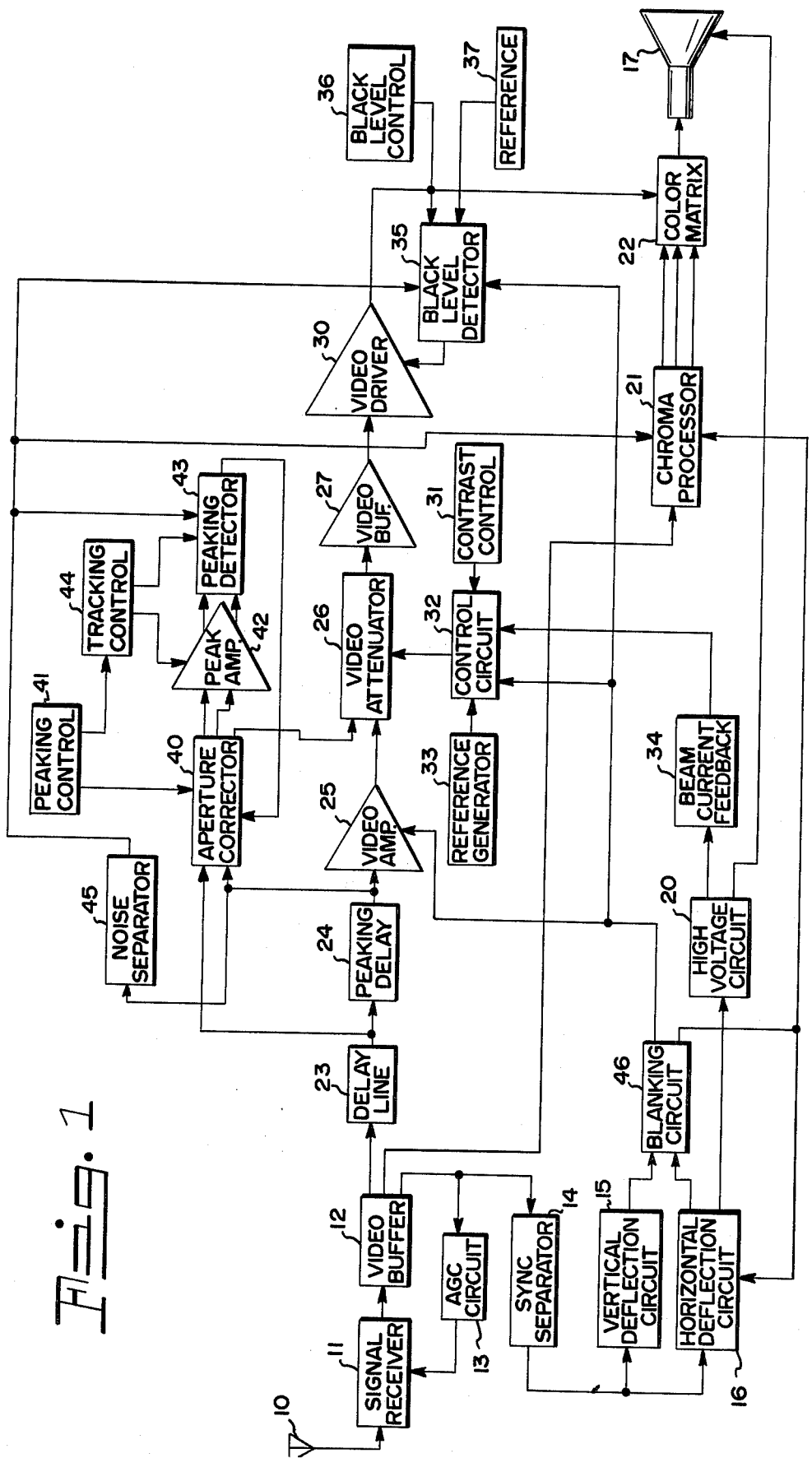
FIG. 1 is a block diagram of a television receiver incorporating a preferred embodiment of the invention.

FIG. 1 is a block diagram of a television receiver incorporating a video processing system in accordance with the invention. A signal receiving means illustrated as antenna 10 is connected to an input of a signal receiver 11. Signal receiver 11 receives a radio frequency (RF) carrier modulated by a composite video signal from antenna 10 and processes the received signal to provide a composite video signal to a video buffer 12. Video buffer 12 provides at least the synchronizing pulse portion of the composite video signal to an automatic gain control (AGC) circuit 13 and to a synchronizing pulse separator 14. AGC circuit 13 provides a gain control signal to signal receiver 11. Sync separator 14 provides separated synchronizing pulses to a vertical deflection circuit 15 and a horizontal deflection circuit 16. Deflection circuits 15 and 16 include deflection windings associated with an image display device illustrated as a cathode ray tube (CRT) 17 for deflecting the electron beam or beams therein. Horizontal deflection circuit 16 provides an output signal to a high voltage circuit 20 which develops the usual high operating or energization voltages for CRT 17. Video buffer 12 provides at least the chrominance portion of the composite video signal to a chroma processor 21 which processes the chrominance portion of the composite video signal to provide three color difference signals to a color matrix circuit 22. Color matrix 22 combines the color difference signals with the luminance or video signal to provide color signals to CRT 17.

Video buffer 12 further provides the composite video signal to a video amplifier including a plurality of stages. The output of video buffer 12 is connected to a delay line 23 which provides a usual delay equalization between the luminance and chrominance signals. The output of delay line 23 is coupled via a peaking or aperture correction delay 24 to an input of a video amplifier stage 25. Video amplifier 25 comprises a means for providing a video signal to a video signal input of a gain controlled stage illustrated as a video attenuator 26. An output of video attenuator 26 is connected via a video amplifier stage or buffer 27 to an output stage or video driver 30 of the video amplifier. Video driver 30 provides the output luminance portion of the composite video signal to color matrix 22.

Video attenuator 26 has a gain control input which is coupled to a gain control means for providing a gain control signal thereto. The gain control signal causes video attenuator 26 to alter the amplitude of signals applied to the video signal input by an amount determined by the gain control signal. The gain control means includes a means for providing a DC control signal illustrated as a contrast control 31. A control circuit 32 compares the DC control signal from contrast control 31 to a reference provided by a reference generator 33. Control circuit 32 is connected to the gain control input of video attenuator 26. The gain control means also includes a beam current feedback means 34. An output of high voltage circuit 20 is connected to beam current feedback means 34 which has an output connected to an input of control circuit 32. Beam current feedback means 34 detects the level of beam current drawn by CRT 17 from high voltage circuit 20. Beam current feedback means 34 and control circuit 32, accordingly, include automatic control means for automatically altering the gain of video attenuator 26 in response to the beam current of CRT 17.

A black level control means is connected to output stage 30 for detecting the black level of the video signal provided by output stage 30 and for providing a control signal to output stage 30 in response to the detected black level. The output of video driver 30 is connected to an input of a comparing means illustrated as a black level detector 35 which has an output connected to a control input of video driver 30. An adjustable control illustrated as a black level control 36 is also connected to the input of black level detector 35. Black level detector 35 compares the black level of the video signal from video driver 30 to a reference level provided by a source of reference potential 37. Black level control 36 permits viewer adjustment of the black level of the displayed image on CRT 17. Once the viewer selects the desired black level, the black level control means automatically controls the black level of the luminance signal.

The video processing system of FIG. 1 further includes aperture correction means for providing an aperture correction signal to the video signal input of video attenuator 26. The aperture correction means includes an aperture correction stage 40 which receives inputs from the output of delay line 23 and the output of peaking delay 24. Aperture corrector 40 generates an aperture correction signal including pre-shoot and over-shoot signals which are coupled to the video signal input of video attenuator 26. Accordingly, video attenuator 26 provides an aperture corrected video signal or combined video signal and aperture correction signal to video buffer 27 and video driver 30. The amplitude of the pre-shoot and over-shoot signals is controlled by a variable bias means illustrated as a peaking control 41 which has an output connected to a control input of aperture corrector 40.

A pair of differential outputs from aperture corrector 40 are coupled to automatic control means such as the inputs of a peaking amplifier 42. Peaking amplifier 42 provides differential outputs to a peaking detector 43 which provides an automatic control signal to aperture corrector 40. An output of peaking control 41 is connected to a tracking control 44 which provides outputs to peaking amplifier 42 and peaking detector 43. Tracking control 44 causes the automatic control means to track the viewer preference setting of peaking control 41.

The output of peaking delay 24 is also connected to an input of a noise separator 45 which provides noise suppression signals to peaking detector 43, black level detector 35, and chroma processor 21. Noise separator 45, for example, detects noise pulses which have amplitudes that exceed the synchronizing pulse amplitude to disable desired portions of the video processing system and chroma processor. The noise suppression signals inhibit the automatic control circuits from setting-up on noise pulses.

Outputs from vertical deflection circuit 15 and horizontal deflection circuit 16 are coupled to inputs of a blanking circuit 46 which provides blanking pulses to video amplifier 25, control circuit 32, and black level detector 35. The vertical and horizontal blanking pulses from blanking circuit 46 cause the video amplifier to blank CRT 17 during retrace or blanking intervals. Another output of blanking circuit 46 can be connected to an input of horizontal deflection circuit 16 to provide automatic frequency and phase control of the horizontal oscillator in circuit 16. Similarly, pulses from blanking circuit 46 can be coupled to chroma processor 21 to gate the color burst signal.

At least the luminance portion of the composite video signal is coupled from video buffer 12 by delay line 23 and the video amplifier to color matrix 22. The amplified and controlled video signal is matrixed with the color difference signals in color matrix 22 to provide suitable drive signals for CRT 17. The black level control means controls the black level of the displayed image in accordance with the viewer preference setting of black level control 36. If the black level of the received signal undesirably varies, the black level control means provides a control signal to video driver 30 to automatically adjust the black level.

Automatic contrast control is provided by varying the gain of video attenuator 26 in accordance with the viewer preference setting of contrast control 31 and the level of beam current drawn by CRT 17. The aperture correction or peaking signal provided by aperture corrector 40 is coupled to the video signal input of video attenuator 26 so that the aperture correction signal is amplified or attenuated by the same gain as the video signal. The amount of aperture correction is controlled by the viewer preference setting of peaking control 41 with the automatic control loop controlling the amount of peaking to track the setting of peaking control 41. The automatic control loop thus causes aperture corrector 40 to peak or depeak the video signal in response to deficient or excessive pre-shoot and over-shoot. The automatic control loop also causes aperture corrector 40 to depeak the video signal when the video signal contains excessive noise. The preferred implementation of the video processing system is in integrated circuit form with certain discrete components or circuits connected thereto.

Figure 2:
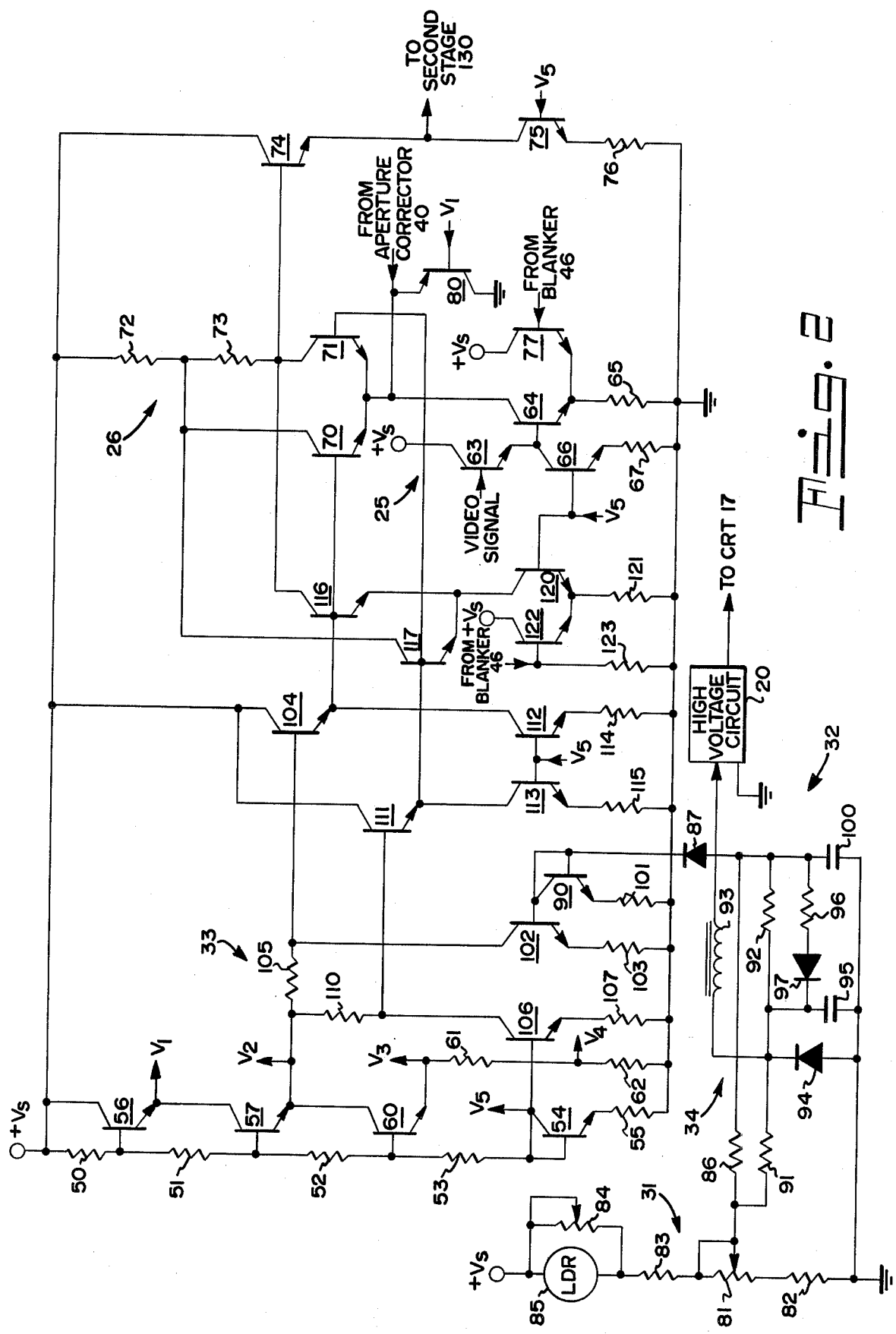
FIG. 2 is a schematic diagram of a portion of the block diagram of FIG. 1 including a portion of the video amplifier and contrast control circuitry.

FIG. 2 is a schematic illustration of video amplifier 25, video attenuator 26, contrast control 31, control circuit 32, reference generator 33, and beam current feedback circuit 34. The contrast control operates to provide a contrast or gain control signal to video attenuator 26 to control the gain thereof between maximum and minimum limits.

In accordance with typical integrated circuit practice, a bias chain is utilized to provide various energizing, bias, and reference voltages. An external source of energizing voltage illustrated as a terminal $+V_S$ is connected by a chain of resistors 50, 51, 52, and 53 to a base and collector of a transistor 54. Transistor 54 further has an emitter connected by a resistor 55 to a common conductor illustrated as circuit ground. The junction between resistors 50 and 51 is connected to a base of a transistor 56 which has a collector connected to source $V_S$ and an emitter connected to a bias line $V_1$. The junction between resistors 51 and 52 is connected to a base of a transistor 57 which has a collector to bias line $V_1$ and an emitter connected to a bias line $V_2$. The junction between resistors 52 and 53 is connected to a base of a transistor 60 which has a collector connected to bias line $V_2$ and an emitter connected to a bias line $V_3$. Bias line $V_3$ is connected by a resistor 61 in series with the resistor 62 to circuit ground. The junction between resistor 61 and 62 is connected to a bias line $V_4$. The base and collector of transistor 54 are connected to a bias line $V_5$. Accordingly, a variety of voltage levels are provided by the bias chain with the magnitude of the voltages depending upon the ratios of the various resistors. Emitter-follower transistors 56, 57, and 60 tend to diminish loading effects on the bias chain.

Transistor 54 is connected to provide a diode in integrated circuit form. Other similarly connected transistors also function as diodes and may be called diodes herein. Video amplifier 25 includes a transistor 63 which has a base connected to the output of peaking delay 24 of FIG. 1. A collector of transistor 63 is connected to source $V_S$ and an emitter is connected to a base of a transistor 64. An emitter of transistor 64 is connected by a resistor 65 to circuit ground. The emitter of transistor 63 is further connected to a collector of a transistor 66 which has an emitter connected by a resistor 67 to circuit ground. A base of transistor 66 is connected to the $V_5$ bias line.

The collector of transistor 64 is connected to the video signal input illustrated as the emitters of a pair of transistors 70 and 71 of video attenuator 26. A collector of transistor 70 is connected by a resistor 72 to source $V_S$, while a collector of transistor 71 is connected by a resistor 73 to the collector of transistor 70. Accordingly, transistors 70 and 71 have different load resistances, that is, resistors 72 and 73 comprise the collector load resistance of transistor 71 while resistor 72 comprises the collector load resistance of transistor 70.

The collector of transistor 71, which comprises the output of video attenuator 26, is connected to a base of a transistor 74, which comprises the input stage of video buffer 27. A collector of transistor 74 is connected to source $V_S$ and an emitter is connected to a second stage of video buffer 27 illustrated in FIG. 3. The $V_5$ bias line is connected to a base of a transistor 75 which has a collector connected to the emitter of transistor 74 and an emitter connected by a resistor 76 to circuit ground.

The video signal with negative-going black level is applied to the base of emitter-follower transistor 63. Transistor 66 is a current source for transistor 63. Transistor 63 shifts the level of the input video signal down by approximately 0.7 volts corresponding to the base-emitter volt drop of transistor 63. Transistor 64 comprises a video signal current source for video attenuator transistors 70 and 71. The collector current of transistor 71 flows through both of resistors 72 and 73 while the collector current of transistor 70 flows through resistor 72. Accordingly, when transistor 71 is conducting and transistor 70 is off, the gain of the video amplifier and attenuator is $G = (R72 + R73)/R65$. Similarly, when transistor 70 is conducting and transistor 71 is off, the gain is $G = R72/R65$. When both of transistors 70 and 71 are conducting, the gain is between the limits defined by the off states of transistors 70 and 71. Thus, by controlling the relative conduction of transistors 70 and 71, the gain of video attenuator 26 is controlled.

In one practical embodiment of the invention resistor 72 was 500 ohms, resistor 73 was 4,500 ohms, and resistor 65 was 1,000 ohms providing a range of gain control from 0.5 to 5.0. When both of transistors 70 and 71 are conducting, the gain is between those limits. The video signal with positive going black level at the collector of trasistor 71 is coupled via transistor 74 to the second stage of video buffer 27.

A transistor 77 has an emitter connected to the emitter of transistor 64 and a collector connected to source $V_S$. A base of transistor 77 receives a blanking signal from blanking circuit 46 to turn transistor 64 off during retrace or blanking intervals. A transistor 80 has a collector connected to circuit ground, an emitter connected to the emitters of transistors 70 and 71, and a base connected to the $V_1$ bias line. Transistor 81 is a clamp which limits the positive voltage at the emitters of transistors 70 and 71 to a desired maximum level.

Contrast control 31 includes a variable resistor 81 which has one end connected by a resistor 82 to circuit ground and the other end connected by a resistor 83 in series with a variable resistor 84 to source $V_S$. A light dependent resistor (LDR) 85 is connected in parallel with resistor 84. LDR 85 is connected in parallel with resistor 84. LDR 85 can be positioned to detect ambient light so that the contrast varies with the ambient lighting conditions. Variable resistor 84 is a range control for LDR 85. The output tap of variable resistor 81 is connected by a resistor 86 in series with a diode 87 to a base and collector of a transistor 90. A pair of resistors 81 and 92 are connected in series between the output of variable resistor 81 and diode 87.

High voltage circuit 20 is typically energized by a secondary winding 93 of the horizontal output transformer contained in horizontal deflection circuit 16. The return side of winding 93 is connected to the junction of resistors 91 and 92. A diode 94 and a capacitor 95 are connected in parallel between circuit ground and the junction of resistors 91 and 92. A resistor 96 and a diode 97 are connected in series between diode 87 and the junction of resistors 91 and 92. A capacitor 100 is connected between diode 87 and circuit ground.

An emitter of transistor 90 is connected by a resistor 101 to circuit ground. The collector of transistor 90 is connected to a base of a transistor 102 which has an emitter connected by a resistor 103 to circuit ground. A collector of transistor 102 is connected to a base of a transistor 104 which has a collector connected to source $V_S$. The $V_2$ bias line is connected by a resistor 105 to the base of transistor 104. A transistor 106 has a base connected to the collector of transistor 54, an emitter connected by a resistor 107 to circuit ground, and a collector connected by a resistor 110 to bias line $V_2$. The collector of transistor 106 is further connected to a base of a transistor 111 which has a collector connected to source $V_S$.

The $V_5$ bias line is connected to bases of a pair of transistors 112 and 113. Transistor 112 has an emitter connected by a resistor 114 to circuit ground and a collector connected to an emitter of transistor 104. Transistor 113 has an emitter connected by a resistor 115 to circuit ground and a collector connected to an emitter of transistor 111. The emitter of transistor 104 is further connected to the base of transistor 70 and to a base of a transistor 116. A collector of transistor 116 is connected to the collector of transistor 71. The emitter of transistor 111 is further connected to the base of transistor 71 and to a base of a transistor 117 which has a collector connected to the collector of transistor 70. A transistor 120 has a base connected to the $V_5$ bias line, an emitter connected by a resistor 121 to circuit ground, and a collector connected to emitters of transistors 116 and 117. A transistor 122 has a collector connected to source $V_S$, an emitter connected to the emitter of transistor 120 and a base connected by a resistor 123 to circuit ground. An output from blanking circuit 46 is connected to the base of transistor 122 so that transistor 120 is turned off during blanking or retrace intervals.

In operation, transistors 54 and 106 are a current mirror or current source wherein the collector current of transistor 106 is a constant current determined primarily by the ratio of resistors 107 and 55 and the magnitude of bias voltage $V_5$. Similarly, transistors 90 and 102 are a current mirror, current source, or current multiplier wherein the collector current of transistor 102 is variable and accurately tracks the input current through diode 87. The input or contrast control current through diode 87 is dependent upon the setting of contrast control 81, the resistance of LDR 85, and the feedback signal from high voltage circuit 20 representative of beam current in CRT 17.

At minimum contrast the input current through diode 87 is substantially zero so that the collector current of transistor 102 is also substantially zero. Negligible current flows through resistor 105 so that there is substantially no volt drop across resistor 105. The collector current of transistor 106 flows through resistor 110 to develop a differential voltage across the bases of transistors 104 and 111. This differential voltage also appears at the emitters of transistors 104 and 111 and is coupled to the bases of transistors 70 and 71. Transistors 112 and 113 are matching current sources for transistors 104 and 111, respectively. At minimum contrast the circuit constants are such that the volt drop across resistor 110 is sufficient to cause transistor 71 to be substantially off and transistor 70 to conduct all of the emitter current of video attenuator 26. When transistor 71 is off, the gain of video attenuator 26 is reduced to a minimum corresponding to minimum contrast.

At maximum contrast the input current through diode 87 causes the collector current of transistor 102 to be substantially twice the collector current of transistor 106. Assumming resistors 105 and 110 are of equal size, the volt drop across resistor 105 will be twice the volt drop across resistor 110 so that a differential voltages will be developed across the bases of transistors 111 and 104 in the opposite direction. This differential voltage will cause transistor 70 to be substantially off while transistor 71 conducts all of the emitter current. When transistor 70 is off, the gain of video attenuator 26 is at a maximum corresponding to maximum contrast.

In the above-mentioned practical embodiment, the collector current of transistor 106 was arranged to be approximately 100 microamperes while the range of contrast control current through transistor 102 was approximately 0–200 microamperes. Since the volt drop across resistor 110 remained substantially constant, the voltage at the base of transistor 111, and hence, the voltage at the base of transistor 71, also remained constant. The volt drop across resistor 105, however, varied from approximately 0 to 200 millivolts (0.2 volts). Accordingly, the differential voltage at the bases of transistors 104 and 111, and hence, the differential gain control voltage at the bases of transistors 70 and 71, varied from approximately +0.1 volts to −0.1. volts. This differential voltage was sufficient to switch all of the video signal current at the collector of transistor 64 through transistor 70 at minimum contrast and through transistor 71 at maximum contrast.

Emitter-follower transistors 104 and 111 provide low input impedances to transistors 70 and 71 to minimize the AC base-emitter voltage of transistors 70 and 71. Minimizing the AC base-emitter voltage of transistors 70 and 71 minimizes linearity distortion of the video signal by video attenuator 26.

Transistors 116 and 117 comprise a form of doubly balanced modulator to hold the black level at the collector of transistor 71 substantially constant. To understand the operation of this circuit, assume that the current through current source transistor 120 is 1.0 milliampere and that the black level current through transistor 64 is also 1.0 milliampere. Transistor 116 is driven by transistor 104 while transistor 117 is driven by transistor 111. Accordingly, transistors 70 and 116 will have the same collector currents while transistors 71 and 117 will have the same collector currents regardless of the contrast control setting. Thus, at black level of the currents through resistors 72 and 73 will remain constant regardless of the contrast control setting. Of course, when the video signal is greater than black level, the current through transistor 64 will be greater than 0.1 milliamperes so that the balanced condition no longer applies. Accordingly, the doubly balanced modulator including transistors 116 and 117 tends to hold black level at the base of transistor 74 relatively constant so that the range of control required of the black level control is not as great. While the circuit was described as if perfect balance at black level were obtained, perfect balance is not essential because the black level control compensates for variations in black level at the base of transistor 74.

The feedback loop including high voltage circuit 20 provides automatic gain control for the contrast control. This circuit controls the difference between the white level and black level of the video signal. Since the black level is subsequently controlled, the automatic contrast control effectively controls the white level of the video signal.

The beam current in CRT 17 flows through high voltage circuit 20 which can be a typical voltage multiplier circuit. Accordingly, the current drawn through winding 93 on the horizontal output transformer is a measure of the beam current in CRT 17. Capacitors 95 and 100 filter the current through winding 93 to provide a voltage thereacross which varies with the average beam current in CRT 17. The filter time constant is sufficiently long so that the average beam current is detected. Otherwise the feedback loop would tend to wash out the displayed image on CRT 17.

The contrast control current from variable resistor 81 flows through resistor 86 and series resistors 91 and 92 to control the collector current of transistor 102. When the beam current increases, the voltage across capacitor 95 decreases so that less current flows through resistor 92 and the contrast control current correspondingly decreases. Similarly, when the average beam current decreases, the voltage across capacitor 95 increases so that greater current flows through resistor 92 to increase the gain of video attenuator 26 to increase the contrast. Thus, the contrast is automatically controlled by the average beam current level of the beam current in CRT 17.

As was indicated previously, the feedback loop operates on the average beam current in CRT 17 so that the displayed image is not washed out. The feedback constant or loop gain is also sufficiently low so that "soft" control is provided. Changes in the brightness level from one scene to another cause a corresponding change in beam current. Since this variation in beam current is desired, the feedback loop has a sufficiently low feedback constant or gain to permit scene-to-scene variations. The feedback constant also should be sufficiently low to permit the viewer preference control 81 to have a reasonable range of control.

If the beam current increases sufficiently, diode 97 will become forward biased to effectively place resistor 96 in parallel with resistor 92. Resistor 96 is much smaller than resistor 92 so that the automatic control loop rapidly reduces the contrast control current through diode 87. At some level of beam current the current through diode 87 will be reduced to zero thereby turning video attenuator 26 to minimum gain and minimum contrast. Accordingly, the automatic feedback loop also provides beam current limiting. The threshold for the beam current limiter tracks the setting of contrast control 81 so that at lower contrast settings the beam current limiting threshold is proportionally reduced. Diode 87 prevents reverse current flow out of transistors 90 and 102. Diode 94 prevents the voltage at the junction of resistors 91 and 92 from becoming negative due to excessively high beam currents.

In one practical embodiment of the invention resistors 86 and 92 were 68,000 ohms while resistors 91 and 96 were 6,800 ohms. Contrast control 81 provided on output voltage of less than 1.0 volts at minimum contrast and about 8–12 volts at maximum contrast, both depending upon the resistance of LDR 85 and the setting of variable resistor 84.

Figure 3:
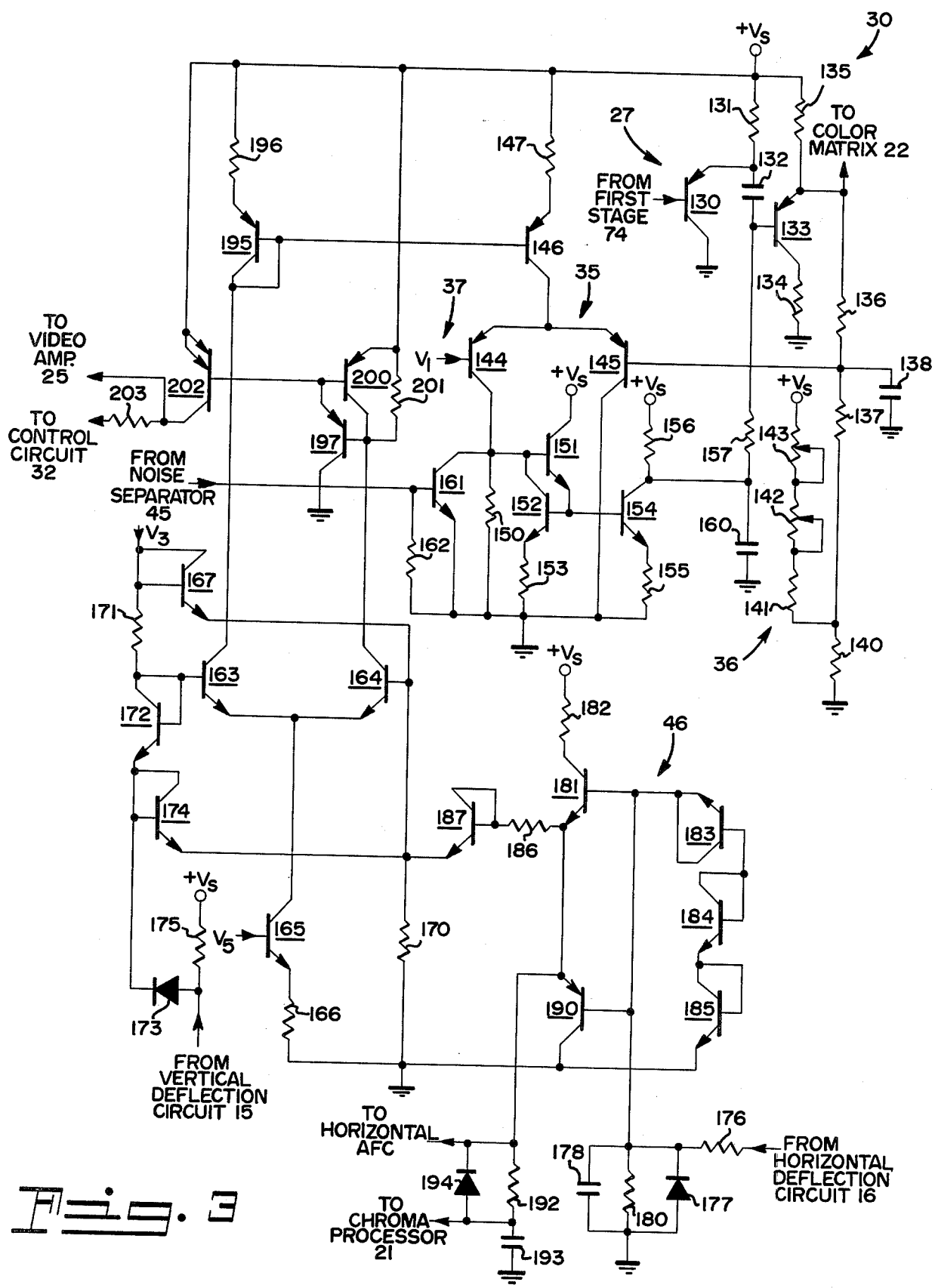
FIG. 3 is a schematic diagram of another portion of the block diagram of FIG. 1 including a portion of the video amplifier and the blanking and black level control circuitry.

FIG. 3 is a schematic diagram of the black level control means and blanking circuit. The schematic diagram of FIG. 3 includes the second stage of video buffer 27, video driver 30, black level detector 35, black level control 36, reference 37, and blanking circuit 46.

The second stage of video buffer 27 comprises a transistor 130 which has a collector connected to circuit ground and a base connected to the emitter of transistor 74 of FIG. 2. An emitter of transistor 130 is connected by a resistor 31 to source $V_S$ and by a coupling capacitor 132 to a base of a video driver transistor 133. Transistor 133 has a collector connected by a resistor 134 to circuit ground and an emitter connected by a resistor 135 to source $V_S$. The emitter of transistor 133 is further connected to color matrix 22. The emitter of transistor 133 is further connected by resistors 136, 137, and 140 in series to circuit ground.

Black level control 36 includes a series connection of a resistor 141 and variable resistors 142 and 143 between the junction of resistors 137 and 140 and source $V_S$. Variable resistor 143 is the viewer preference control while variable resistor 142 is a range or set-up control. A capacitor 138 is connected between the junction of resistors 136 and 137 and circuit ground.

Black level detector 35 includes a pair of transistors 144 and 145 connected as a comparing means or differential comparator. A transistor 146 has an emitter connected by a resistor 147 to source $V_S$ and a collector connected to emitters of transistors 144 and 145. A base of transistor 144 is connected to bias line $V_1$ which corresponds to reference 37 of FIG. 1. A base of transistor 145 is connected to the junction between resistors 136 and 137. A collector of transistor 145 is connected to circuit ground. A collector of transistor 144 is connected by a resistor 150 to circuit ground and to a base of a transistor 151 and a collector of a transistor 152. An emitter of transistor 151 is connected to a base of transistor 152 which has an emitter connected by a resistor 153 to circuit ground. The collector of transistor 151 is connected to source $V_S$, while the emitter of transistor 151 is connected to a base of a transistor 154. Transistor 154 has an emitter connected by a resistor 155 to circuit ground and a collector connected by a resistor 156 to source $V_S$. The collector of transistor 154 is further connected by a resistor 157 to the base of transistor 133 and by a charge storage capacitor 160 to circuit ground.

A transistor 161 has a collector connected to the collector of transistor 144, an emitter connected to circuit ground and a base connected by a resistor 162 to circuit ground. An output from noise separator 45 of FIG. 1 is connected to the base of transistor 161.

Blanking circuit 46 includes a pair of transistors 163 and 164. A transistor 165 has a base connected to the $V_5$ bias line, an emitter connected by a resistor 166 to circuit ground, and a collector connected to the emitters of transistors 163 and 164. Transistors 165 is a current source for transistor 163 and 164. The $V_3$ bias line is connected to a collector and a base of a transistor 167 which has an emitter connected to a base of transistor 164. The base of transistor 164 is further connected by a resistor 170 to circuit ground. The $V_3$ bias line is further connected by a resistor 171 to a base of transistor 163 which is further connected to a collector and a base of a transistor 172.

Pulses at the vertical deflection rate are connected from the output of vertical deflection circuit 15 via a diode 173 to the emitter of transistor 172 and to a base and collector of a transistor 174 which has an emitter connected to the base of transistor 164. A resistor 175 is connected from source $V_S$ to the junction of diode 173 with the output of vertical deflection circuit 15.

The output from horizontal deflection circuit 16 is connected by a resistor 176 in series with a resistor 180 to circuit ground. The junction between resistor 176 and resistor 180 is connected by a clamping diode 177 and a capacitor 178 to circuit ground and to a base of a transistor 181 which has a collector connected by a resistor 182 to source $V_S$. The base of transistor 181 is further connected to an emitter and a collector of a transistor 183 which is connected as a Zener diode. A base of transistor 183 is connected to a collector and base of a transistor 184. Transistor 184 has an emitter connected to a collector and a base of a transistor 185 which has an emitter connected to circuit ground. Transistors 184 and 185 and all similarly connected transistors are integrated circuit diodes and the diode symbol could be substituted therefor. An emitter of transistor 181 is connected by a resistor 186 to a base and collector of a transistor 187 which has an emitter connected to the base of transistor 164.

A transistor 190 has a collector connected to circuit ground, a base connected to the base of transistor 181, and an emitter connected to the emitter of transistor 181. The emitter of transistor 190 is further connected by a resistor 192 in series with a filter capacitor 193 to circuit ground. A diode 194 is connected in parallel with resistor 192.

A collector of transistor 163 is connected to a collector and a base of a transistor 195 which has an emitter connected by a resistor 196 to source $V_S$. The base of transistor 195 is further connected to a base of transistor 146.

A collector of transistor 164 is connected to a base of a transistor 197 and to a collector of a transistor 200. A collector of transistor 197 is connected to circuit ground and an emitter is connected to a base of transistor 200. Transistor 200 has an emitter connected to source $V_S$. A resistor 201 is connected between the collector of transistor 164 and source $V_S$. The base of transistor 200 is further connected to a base of a transistor 202 which has a pair of emitters connected to source $V_S$. Transistor 202 further has a collector connected to the base of transistor 77 in video amplifier 25 and by a resistor 203 to the base of transistor 122 in control circuit 32 of FIG. 2.

In operation, the video signal with positive-going black level is coupled to the base of transistor 130. The video signal is AC coupled via capacitor 132 to the base of transistor 133. The video signal at the emitter of transistor 133 is coupled to color matrix 22 and across the resistor network including resistors 136, 137, and 140–143. The portion of the video signal appearing at the junction of the resistors 136 and 137 is coupled to the base of transistor 145. Filter capacitor 138 rolls off high frequency signals such as the aperture correction signals and noise to minimize black level shifts with the setting of peaking control 41 and weak signal noise. Transistors 144 and 145 are a differential comparator which compares the video signal to the reference voltage $V_1$. Transistor 146 supplies current to the emitters of transistors 144 and 145.

If the video signal level at the base of transistor 145 has an amplitude at least 0.1 volts less than $V_1$, transistor 144 will be off and transistor 145 will conduct all of the collector current of transistor 146 to circuit ground. Since black level is positive-going at the base of transistor 145, transistor 145 will be normally conducting. During this time, capacitor 160 charges through resistor 156 which comprises a means for charging capacitor 160. The voltage across capacitor 160 comprises a black level control signal which is coupled via resistor 157 to the control input or terminal of the video amplifier illustrated as the base of transistor 133 to bias transistor 133.

If the signal at the base of transistor 145 exceeds $V_1$ less 0.1 volts, transistor 144 will conduct. If the base voltage of transistor 145 is at least 0.1 volts greater than $V_1$, transistor 144 will conduct all of the collector current of transistor 146. The collector current of transistor 144 is coupled to the base of transistor 151 which supplies base current to transistor 152. Transistors 151, 152, and 154 comprise a buffered current mirror or current multiplier wherein the current through transistor 154 depends upon the collector current of transistor 144 and the ratio of resistors 155 and 153. Since transistor 154 conducts a relatively large current, transistor 151 is added to supply additional base drive current for transistor 154 thereby buffering the current mirror. Conduction by transistor 154 in response to conduction by transistor 144 discharges capacitor 160. Accordingly, transistor 154 comprises a means for discharging capacitor 160.

During non-conduction intervals of transistor 144, capacitor 160 charges to increase the voltage level at the base of transistor 133, and hence, the voltage level at the emitter of transistor 133 and at the junction of resistors 136 and 137. At some point the voltage level at the base of transistor 145 will become sufficient to cause transistor 144 to conduct to discharge capacitor 160. The discharge time constant is much shorter than the charge time constant for capacitor 160 so that the circuit tends to set-up on the highest amplitude signal, that is, the black level signal. The black level can be adjusted by variable resistors 142 and 143 which adjust the bias level at the junction of resistors 136 and 137.

Blanking circuit 146 is described in detail in the abovereferenced co-pending application of A. H. Klein. Accordingly, the blanking circuit will not be discussed in complete detail herein. The voltage $V_3$ is coupled to the base of transistor 163 through resistor 171 and to the base of transistor 164 through diode 167. The volt drop across diode 167 assures conduction by transistor 163 and non-conduction by transistor 164 during non-blanking intervals. Accordingly, the collector current of transistor 165 flows through transistor 163 and transistor 195. Transistor 195 is a reference diode for the current mirror or current multiplier including transistor 146.

Pulses at the horizontal deflection rate from horizontal deflection circuit 16 are coupled via resistor 176 to the base of transistor 181. The voltage divider including resistors 176 and 180 together with Zener diode 183 and diodes 184 and 185 limit the amplitude of the pulses at the base of transistor 181 to a desired level. Diode 177 limits negative voltages at the base of transistor 181. Capacitor 178 filters the voltage at the base of transistor 181 to suppress spurious signals. Conduction by transistor 181 during horizontal rate pulses turns transistor 164 on so that all of the collector current of transistor 165 flows therethrough. Accordingly, transistor 163 is turned off and no current flows through transistor 195. When transistor 195 turns off, transistor 146 also turns off to blank black level detector 35.

Conduction by transistor 164 provides base current to transistor 197 which, in turn, provides base current to transistor 200. Transistors 197, 200, and 202 comprise a buffered current mirror or current multiplier. Transistor 197 supplies the additional base current required to drive transistor 202. Transistor 202 has a large emitter area, shown as two emitters, to supply sufficient drive for blanking video amplifier 25 and control circuit 32. Resistor 201 compensates for leakage currents so that leakage currents through transistor 200 will not turn transistor 197 on.

Pulses at the vertical deflection rate from vertical deflection circuit 16 are coupled via diode 173 and diode 174 to the base of transistor 164. Vertical rate pulses cause transistors 163 and 164 and their collector current mirrors/current multipliers to operate in the same manner as horizontal rate pulses. If it is desired to use negative-going vertical rate pulses, diode 173 can be reversed. The negative-going pulses will be coupled via diode 172 to the base of transistor 163 to turn transistor 163 off and transistor 164 on. Accordingly, blanking circuit 46 interrupts the energization current for black level detector 35 so that black level detector 35 does not set-up on blanking or retrace interval signals.

The desired blanking pulses for video amplifier 25 and control circuit 32 are advantageously derived from the same blanking circuit. Other horizontal rate pulses used for frequency and phase controlling the horizontal oscillator in deflection circuit 16 and gating the burst signal in chroma processor 21 can also be advantageously derived from the emitter of transistor 190. Transistor 190 is turned off by the horizontal rate pulses from horizontal deflection circuit 16. The pulses at the emitter of transistor 181 are coupled to horizontal deflection circuit 16 and via resistor 192 and diode 194 to chroma processor 21.

As was described above, the black level control means preferably sets-up on the blackest portion of the video signal. The video signal has video intervals and blanking intervals with the blanking intervals having a signal level corresponding to the black level of the video intervals. If the black level detector 35 is permitted to set-up on blanking interval signals, the black level control means cannot correct for errors in the relative amplitudes of the video black level and blanking interval signal. That is, if the black level of the video signal is improperly adjusted at the studio or for some other reason becomes incorrect, the automatic black level control cannot correct for the error. By blanking black level detector 35, however, black level detector 35 does not set-up on blanking interval signals.

If a true peak detector is used for black level detector 35, however, improper operation may result. For example, black level detector 35 may set-up on noise signals. To inhibit setting-up on noise signals, noise separator 45 provides a noise signal to the base of transistor 161 to turn transistor 161 on in response to noise pulses which have amplitudes greater than the synchronizing pulse amplitude. When transistor 161 turns on, any current flowing through transistor 144 is shunted to circuit ground. Even with noise protection, however, black level detector 35 may set-up on lower level noise or on residual noise pulses which are not completely suppressed. Also, when scenes with no black are being displayed, black level detector 35 would set-up on the darkest portion of the scene. While most scenes will have some black or very dark signal content, it is objectionable to cause the darkest portion of every scene to be displayed at black level. Also, on a constant or flat field, using a peak detector as a black level detector will cause the raster to turn black.

To circumvent these disadvantages, the vertical blanking interval is not completely blanked out in black level detector 35 and the charging and discharging time constants for capacitor 160 are adjusted so that the detector, while predominantly a peak detector, also averages the signal content. To achieve this operation, it should be noted that sync separator 14 separates the vertical synchronizing pulses which then trigger vertical deflection circuit 15. The output pulse from vertical deflection circuit 15 is applied to blanking circuit 46. Blanking circuit 46 provides a blanking pulse to black level detector 35 in response to, and somewhat after, the start of the vertical blanking interval. Accordingly, some of the vertical blanking interval signal, a residual leading portion, is coupled through the video amplifier to the emitter of transistor 133 before black level detector 35 is blanked.

The vertical blanking pulse from blanking circuit 46 can also be terminated before the end of the vertical blanking interval signal to provide trailing portion. This unblanked residual trailing portion can also be coupled through the video amplifier to the emitter of tranistor 133. Additionally, small leading and trailing portions of the horizontal blanking interval can be left unblanked so that residual portions of the horizontal blanking interval signal are coupled through the video amplifier to the emitter of transistor 133.

The values of the resistors 155 and 156 together with capacitor 160 are selected so that the proper time constants are obtained. Specifically, the current through transistor 154 can be taken as given because it is determined by circuit constants internal to the integrated circuit. The values of capacitor 160 and resistor 156 are then selected so that the ratio of discharge to charge currents is proper to perform the desired amount of averaging of the residual blanking intervals with the signal components during the video intervals.

The presently preferred time constants for charging and discharging capacitor 160 is such that on an oil white filed the black level control will set-up somewhere between white level and black level. In one practical embodiment of the invention about 5–10% of the area of the raster was required to be black for the black level control to set-up at or near the black level of the video signal. Thus, the residual blanking interval pulses do not cause the automatic black level control to set-up on the blanking level but do prevent the control from setting-up in a manner that causes the screen to be turned black when a flat or white field is intended.

The time constants are also preferably selected to be sufficiently long so that the voltage across capacitor 160 does not change too abruptly. That is, capacitor 160 is not discharged too rapidly through transistor 154 to cause ripple on the black level. The time constant for charging capacitor 160 through resistor 156 should be short enough, however, so that when the black level shifts, capacitor 160 acquires sufficient charge to move the video signal to a sufficiently high level to activate black level detector 35 within a reasonable number of fields.

In one practical embodiment, capacitor 160 was 5 microfarads, resistor 156 was 15,000 ohms, and the current through transistor 154 was a maximum of 10 milliamperes. The vertical retrace interval signal was blanked for 0.7 milliseconds and the horizontal retrace interval signal was blanked for 9 microseconds with the remainders being unblanked.

Black level control 36 varies the portion of the video signal coupled to black level detector 35 in the illustrated preferred embodiment. Black level control can be connected to vary the reference voltage $V_1$ applied to transistor 144 instead, as will be evident to those skilled in the art. The illustrated embodiment is preferred, however, because $V_1$ can be generated internal to the integrated circuit while an additional external connection would be required to vary $V_1$.

Figure 4:
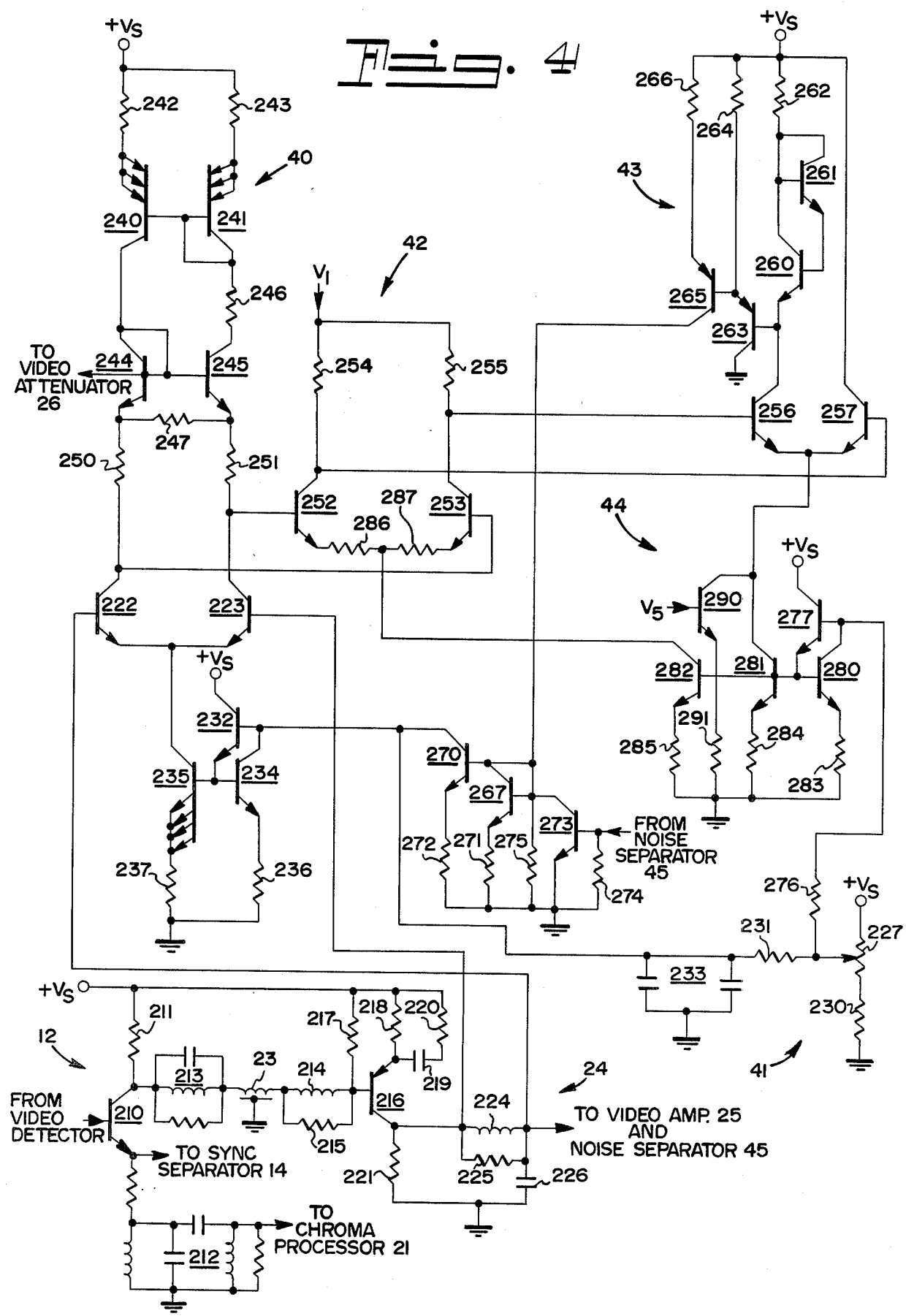
FIG. 4 is a schematic diagram of a further portion of the block diagram of FIG. 1 including the aperture correction circuitry.

FIG. 4 is a schematic diagram of the aperture correction means. FIG. 4 corresponds to the circuitry of video buffer 12, delay line 23, peaking delay 24, and blocks 40–44 of FIG. 1. The output from signal receiver 11 is a composite video signal provided by a video detector. The composite video signal from the video detector is coupled to a base of a transistor 210. Transistor 210 has a collector connected by a resistor 211 to source $V_S$ and an emitter connected to sync separator 14 and via a filter 212 to chroma processor 21. The collector of transistor 210 is connected by a 3.58 MHz trap 213 to delay line 23.

The output of delay line 23 is coupled via a parallel connected inductor 214 and resistor 215 to a base of an inverter transistor 216. The base of transistor 216 is further connected by a resistor 217 to source $V_S$. An emitter of transistor 216 is connected by a resistor 218 to source $V_S$ and by a capacitor 219 in series with the resistor 220 to source $V_S$. A collector of transistor 216 is connected by a resistor 221 to circuit ground.

Aperture corrector 40 includes a pair of transistors 222 and 223. The collector of transistor 216 is connected to a base of transistor 223 and by an inductor 224 in parallel with a resistor 225 to a base of transistor 222 and to the inputs of video amplifier 25 and noise separator 45. The base of transistor 222 is connected by a capacitor 226 to circuit ground.

Peaking control 41 includes a variable or adjustable bias means illustrated as a potentiometer 227. One end of the resistance element of potentiometer 227 is connected to source $V_S$ while the other end is connected by a resistor 230 to circuit ground. The tap of potentiometer 227 is connected by a resistor 231 to a base of a transistor 232. The base of transistor 232 is further connected to circuit ground by a pair of capacitors 233. A collector of transistor 232 is connected to source $V_S$ while an emitter thereof is connected to a base of a transistor 234 and a base of a transistor 235. A collector of transistor 234 is connected to the base of transistor 232 and an emitter is connected by a resistor 236 to circuit ground. Transistor 235 has a large emitter area, illustrated as four emitters, connected by a resistor 237 to circuit ground. A collector of transistor 235 is connected to emitters of transistors 222 and 223.

Aperture corrector 40 further includes a pair of transistors 240 and 241 connected as a current source or current mirror. Transistor 241 forms a reference for the current mirror and has a collector connected to a base thereof and to a base of transistor 240. Transistors 240 and 241 are illustrated as having three emitters connected by resistors 242 and 243, respectively, to source $V_S$. A collector of transistor 240 is connected to a base and a collector of a transistor 244. The base of transistor 244 is connected to a base of a transistor 245 which has a collector connected by a resistor 246 to the collector of transistor 241. The bases of transistors 244 and 245 are connected to the video signal input of video attenuator 26. Transistor 244 has an emitter connected by a resistor 247 to an emitter of transistor 245. The emitter of transistor 244 is further connected by a resistor 250 to a collector of transistor 222. The emitter of transistor 245 is further connected by a resistor 251 to a collector of transistor 223.

Peaking amplifier 42 has a pair of transistors 252 and 253. The collector of transistor 223 is connected to a base of transistor 252, while the collector of transistor 222 is connected to a base of transistor 253. A collector of transistor 252 is connected by a resistor 254 to the $V_1$ bias line. A collector of transistor 253 is connected by a resistor 255 to the $V_1$ bias line.

Peaking detector 43 includes a pair of transistors 256 and 257. The collector of transistor 253 is connected to a base of transistor 256, while the collector of transistor 252 is connected to a base of transistor 257. A collector of transistor 257 is connected to source $V_S$. A collector of transistor 256 is connected to an emitter of a transistor 260 which has a base connected to an emitter of a transistor 261. Transistor 261 also has a collector connected to a base thereof and by a resistor 262 to source $V_S$. A collector of transistor 260 is connected to the base of transistor 261. The collector of transistor 256 is further connected to a base of a transistor 263 which has a collector connected to circuit ground and an emitter connected by a resistor 264 to source $V_S$. The emitter of transistor 263 is further connected to a base of transistor 265 which has an emitter connected by a resistor 266 to source $V_S$.

A collector of transistor 265 is connected to a base and a collector of a transistor 267 and to a base of a transistor 270. Transistor 267 has an emitter connected by a resistor 271 to circuit ground. Transistor 270 has an emitter connected by a resistor 272 to circuit ground and a collector connected to the base of transistor 232. An output from noise separator 45 is connected to a base of a transistor 273 which has an emitter connected to circuit ground and a collector connected to the base of transistor 267. The base of transistor 273 is connected by a resistor 274 to circuit ground. The collector of transistor 273 is connected by a resistor 275 to circuit ground.

Tracking control 44 includes a resistor 276 connected between the tap of potentiometer 227 and a base of a transistor 277. Transistor 277 has a collector connected to source $V_S$ and an emitter connected to bases of transistors 280, 281, and 282. Transistor 280 has a collector connected to the base of transistor 277 and an emitter connected by a resistor 283 to circuit ground. Transistor 281 has a collector connected to emitters of transistors 256 and 257 and an emitter connected by a resistor 284 to circuit ground. Transistor 282 has an emitter connected by a resistor 285 to circuit ground and a collector connected by a resistor 286 to an emitter of transistor 252 and by a resistor 287 to an emitter of transistor 253. A transistor 290 has a base connected to the $V_5$ bias line, an emitter connected by a resistor 291 to circuit ground, and a collector connected to the emitters of transistors 256 and 257.

In operation, the video signal is coupled via video buffer 210, delay line 23, and inverter 216 to the base of transistor 223. The video signal also is coupled through the peaking delay comprising inductor 224 and capacitor 226 to the base of transistor 222. The video signal at the base of transistor 222 is delayed slightly from the video signal at the base of transistor 223. Peaking delay 24 is unterminated, that is, it has a high impedance at the base of transistor 222 so that the video signal is reflected back through peaking delay 24 to the base of transistor 223. Thus, the video signal appears undelayed and twice delayed at the base of transistor 223. Resistor 221 has a proper value to terminate peaking delay 24 at the base of transistor 223 so that additional reflections do not occur. Resistor 225 provides damping for peaking delay 24. In some prior art aperture correction circuits the peaking delay is obtained by tapping delay line 23 which could also be used herein.

Potentiometer 227 in peaking control 41 is the viewer preference control for controlling the amount of pre-shoot and over-shoot added to the video signal. Adjustment of potentiometer 227 provides a particular control current via resistor 231 to the base of transistor 232. This current also charges capacitors 233. Transistors 232, 234, and 235 comprise a current mirror or current multiplier for providing emitter current to transistors 222 and 223.

When the video signal is at a constant level, the signals at the bases of transistors 222 and 223 are equal so that onehalf of the current through transistor 235 flows through each of transistors 222 and 223. The collector current of transistor 222 flows through transistor 240 and transistor 244, while the collector current of transistor 223 flows through transistors 241 and 245. Transistor 241 is a reference diode for the current mirror including transistor 240, while transistor 244 is a reference diode for a current mirror including transistor 245.

When the video signal is at a constant level, it is desired that no output current flows to or from video attenuator 26. The current mirror including transistors 240 and 241 assures that equal currents flow through transistors 222 and 223. To explain further, the current through transistor 223 flows through transistor 241. Since transistor 241 is the reference diode for the current mirror, the current through transistor 240, and hence, the current flowing through transistor 222, must be equal thereto. Thus, no current flows to or from video attenuator 26.

Figure 5:
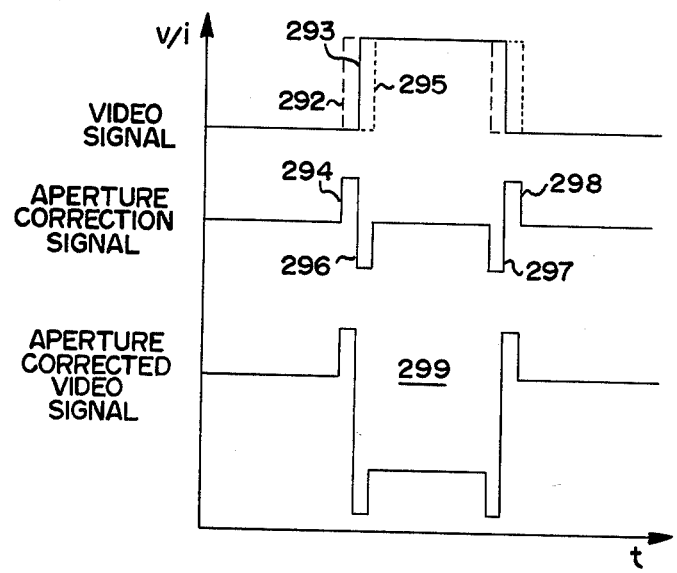
FIG. 5 is a waveform diagram to aid in explaining the operation of the aperture correction circuitry of FIG. 4.

Referring next to FIG. 5, a video signal with a white-going pulse is shown. The undelayed video signal applied to the base of transistor 223 is illustrated by dashed line 292. The once delayed video signal is illustrated by solid line 293. This is the video signal pulse applied to video attenuator 26 via video amplifier 25 and to the base of transistor 222. Transistor 223 receives pulse 292 before transistor 222 receives pulse 293 so that transistor 223 conducts more current than transistor 222. If the transition is sufficiently sharp and of sufficient amplitude, transistor 223 will conduct all of the collector current of transistor 235 while transistor 222 will turn off. Now transistor 241 will force transistor 240 to carry a larger collector current than transistor 222 carries. Thus, some or all of the collector current of transistor 240 will flow to the video signal input of video attenuator 26. This current will cause a black-going voltage to be developed at the base of transistor 74 across resistors 72 and 73 (FIG. 2). This pulse, illustrated as pulse 294 in FIG. 5 is called a black-going pre-shoot.

The twice delayed leading edge transition of the video signal pulse is illustrated by dotted line 295 in FIG. 5. Transistors 222 and 223 also compare the delayed and twice delayed pulses. Since the delayed pulse reaches the base of transistor 222 before the twice delayed pulse reaches the base of transistor 223, transistor 222 conducts more current than transistor 223. If the difference in the pulses is sufficiently great, transistor 223 will turn off. Now transistor 241 will force transistor 240 to conduct less current than transistor 222 conducts so that current will flow out of the video signal input of video attenuator 26. Accordingly, a white-going over-shoot pulse 296 is generated at the base of transistor 74. In a similar manner pre-shoot pulse 297 and over-shoot pulse 298 are generated on the trailing edge of the video signal pulse. The aperture corrected video signal developed at the base of transistor 74 is illustrated by waveform 299 of FIG. 5 wherein the video signal has a positive-going black level, which is to be compared to an inverted-polarity version of positive-going white signal 293.

The amplitude of the aperture correction signal is controlled by varying potentiometer 227 of peaking control 41. The gain of aperture corrector 40 is determined by the amount of current flowing through transistor 235, which is in turn determined by the setting of potentiometer 227.

The current mirror including transistors 244 and 245 permit a differential signal for peaking amplifier 42 to be developed across resistors 250 and 251 without affecting the DC balance of aperture corrector 40. Resistor 247 couples current between the emitters of transistors 244 and 245 to prevent them from completely cutting off on high level signals.

The video processing system in accordance with the invention also includes automatic aperture correction circuitry which automatically maintains the aperture correction at a preset level and automatically depeaks weak and noisy video signals. The automatic peaking or aperture correction control adjusts the aperture corrector gain until the peaks of the white-going over-shoot and pre-shoot pulses track the peaking control setting or threshold. The automatic peaking control features a tracking control which causes the current through peaking amplifier 42 to track with the current through peaking detector 43. These currents also track the current through aperture corrector 40.

As was indicated previously, the sharpness of the displayed image on CRT 17 can vary for many reasons. Many of the causes of these variations differ from one channel to another and from one signal source to another. They may also vary over time thereby necessitating frequent readjustment of potentiometer 227 by the viewer to maintain the desired level of aperture correction. To circumvent this necessity for frequent readjustment of potentiometer 227, the automatic control means including peaking amplifier 42 and peaking detector 43 detects aperture correction signals that exceed a threshold determined by the setting of potentiometer 227. If no such signals are detected, the gain of aperture corrector 40 is increased to increase the amplitude of the aperture correction signal until the desired amount of aperture correction is provided. Similarly, if the aperture correction signals greater than the threshold become excessive, the gain of aperture corrector 40 is decreased. Accordingly, the automatic control means automatically controls the amplitude of the aperture correction signal in response to a bias provided by a variable bias means and in response to the amplitude of the aperture correction signal.

Transistors 277, 280, 281, and 282 provide a current mirror or current multiplier for the currents flowing through peaking amplifier 42 and peaking detector 43. The input current is derived from potentiometer 227 so that a variable reference current is coupled through the buffered reference transistors 277 and 280. Transistor 290 provides a fixed additional emitter current for transistor 256 and 257.

In the quiescent or non-peaking state, the collector voltages of transistors 222 and 223 are equal. Accordingly, the base voltages of transistors 252 and 253 are equal and one-half of the collector current of transistor 282 flows through each of transistors 252 and 253. Resistors 254 and 255 are of unequal values with resistor 255 being larger so that an offset differential voltage is developed at the bases of transistors 256 and 257. Since resistor 255 is larger, the volt drop thereacross will be greater than the volt drop across resistor 254. Accordingly, in the quiescent state transistor 257 will be conducting and transistor 256 will be off. When transistor 256 is off, transistors 263, 265, 267, and 270 will also be off. This state is defined as the peaking detector off state.

When aperture corrector 40 generates a black-going pre-shoots and over-shoots, transistor 223 conducts more than transistor 222. Accordingly, transistor 252 tends to be biased off while transistor 253 tends to be biased on thereby further biasing peaking detector 43 off. Thus, peaking detector 43 does not respond to black-going pre-shoots and over-shoots generated by aperture corrector 40.

When aperture corrector 40 generates white-going pre-shoots and over-shoots, however, transistor 222 conducts more than transistor 223. Accordingly, the differential signal coupled to the bases of transistors 252 and 253 causes transistor 252 to conduct more and transistor 253 to conduct less. If the differential change in conduction is sufficient to overcome the the offset voltage due to the different values of resistors 254 and 255, transistor 256 will be turned on. This offset voltage defines the previously mentioned threshold for the detection of aperture correction signals.

Conduction by transistor 256 causes transistors 263 and 265 to conduct. Conduction by transistor 265, in turn, causes transistor 270 to conduct to discharge capacitors 233. When capacitors 233 are discharged, conduction by transistor 235 decreases to decrease the gain of aperture corrector 40.

Thus, the gain of aperture corrector 40 is controlled by an automatic control loop which is dependent primarily upon the amplitude of the white-going pre-shoots and over-shoots of the aperture correction signal. If the white-going pre-shoots and over-shoots decrease in amplitude, the gain of aperture corrector 40 is automatically increased to increase the amount of aperture correction. Similarly, if the amplitude of the white-going pre-shoots and over-shoots increases, capacitors 233 are discharged to decrease the gain of aperture corrector 40. This feature is particularly advantageous to prevent over-peaking on weak and noisy signals. It should be noted that while only white-going pre-shoots and over-shoots are used by the automatic control loop, black-going pre-shoots and over-shoots could be used as well.

Transistor 273 is turned on by output pulses from noise separator 45 to prevent transistor 270 from discharging capacitors 233 on high level noise. Noise separator 45, however, does not operate on low level noise. Aperture corrector 40 will attempt to provide an aperture correction signal in response to noise transients. If the noise becomes sufficiently concentrated, peaking detector 43 will detect the concentrated peaks of the aperture correction signal due to noise and will cause transistor 270 to discharge capacitors 233 sufficiently to reduce the gain of aperture corrector 40 to minimum. This depeaking action occurs automatically so that the viewer is not required to adjust potentiometer 227 to decrease the peaking of weak and noisy signals.

In one practical embodiment of the invention the following relationships were utilized to obtain proper tracking of aperture corrector 40, peaking amplifier 42, and peaking detector 43. Resistors 231 and 276 were large resistors of identical value. The values of resistors 231 and 276 together with potentiometer 227 and resistor 230 were selected such that over the range of potentiometer 227, the current through resistors 231 and 276 varied over the range 0–200 microamperes. Transistors 232, 234, and 235 multiplied the current through resistor 231 (assumming capacitors 233 were charged) by twenty so that the collector current of transistor 235 varies over the range 0–4 milliamperes. Thus, the gain of aperture corrector 40 could be varied over relatively broad limits. Transistors 277, 280, and 282 multiplied the current through resistor 276 by five so that the collector current of transistor 282 varied over a range of 0–1 milliampere. Similarly, transistors 277, 280, and 281 multiplied the current through resistor 276 by unity so that the collector current of transistor 281 varied over the range 0–200 microamperes. Transistor 290 provided a constant current of 200 microamperes. Thus, the current at the emitters of transistors 256 and 257 varied over the range 200–400 microamperes. All of these currents varied simultaneously and accurately tracked over the range of potentiometer 227.

The threshold of peaking detector 43 established by the offset voltage across resistors 254 and 255 also varies with the setting of potentiometer 227. The offset voltage or voltage difference at the bases of transistors 256 and 257 under quiescent conditions is given by the expression $V_D = (R255 - R254) I_C/2$ where $I_C$ is the collector current of transistor 282. This collector current is divided by 2 because the current equally divides between transistors 252 and 253 under quiescent conditions. Thus, it is readily seen that the offset voltage is directly proportional to the collector current of transistor 282 and varies with the setting of potentiometer 227. This relationship means that peaking detector 43 detects lower amplitude aperture correction signals when the gain of aperture corrector 40 is reduced by altering potentiometer 227. If the offset voltage did not track the setting of potentiometer 227, the loop gain of the automatic control loop would vary depending upon the setting of potentiometer 227.

In the above-mentioned practical embodiment, the collector current of transistor 256 varied over the range 0–400 microamperes depending upon both the setting of potentiometer 227 and the conduction level of transistor 256 due to detected white-going aperture correction signals. Transistors 260, 261, 263, and 265 multiplied the collector current of transistor 256, while the collector current of transistor 265 was further multiplied by transistors 267 and 270. Transistor 270 saturated with an emitter current of 14–18 milliamperes depending upon the setting of peaking control 227. This current when compared to the 0–200 microampere current through resistor 231 provides a discharge to charge current ratio for capacitors 233 that provides a peak detection function.

In this practical embodiment the automatic control loop, when referenced with a properly modulated Indian Head Test Pattern signal, provided a "closed loop" gain of one-half of the "open loop" gain. This gain reduction means that the automatic control loop had a 2-to-1 (6 dB) reserve capability to increase the peaking when necessary no matter where the peaking control was set. Furthermore, the automatic control loop could not increase the peaking more than 6 dB.

Figure 6:
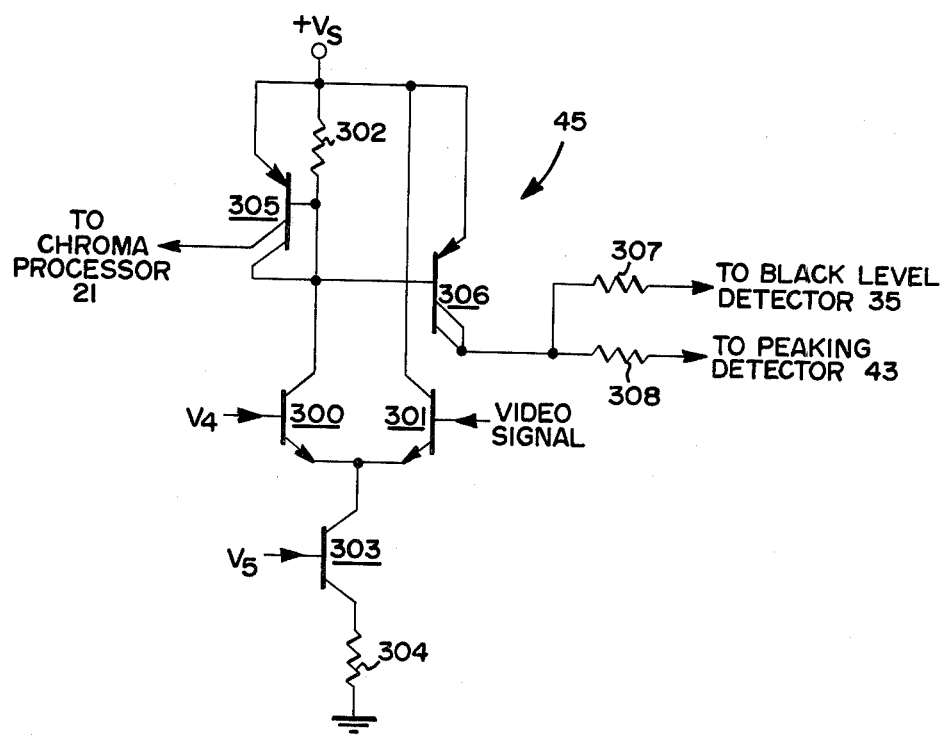
FIG. 6 is a schematic diagram of the noise separator circuitry of FIG. 1.

FIG. 6 is a schematic diagram of noise separator 45. Noise separator 45 includes a pair of transistors 300 and 301. Transistor 300 has a base connected to a source of reference voltage illustrated as the $V_4$ bias line and a collector connected by a resistor 302 to source $V_S$. Transistor 301 has a base connected to receive the video signal from peaking delay 24 and a collector connected to source $V_S$. A transistor 303 has a base connected to the $V_5$ bias line, an emitter connected by a resistor 304 to circuit ground, and a collector connected to emitters of transistors 300 and 301. A transistor 305 has a base connected to the collector of transistor 300, an emitter connected to source $V_S$, a first collector connected to the collector of transistor 300, and a second collector connected to provide a noise suppression signal to chroma processor 21. A transistor 306 has an emitter connected to source $V_S$, a base connected to the collector of transistor 300, and a pair of collectors connected together and via a resistor 307 to the base of transistor 161 in black level detector 35 and by a resistor 308 to the base of transistor 273 in peaking detector 43.

In operation, transistor 303 is a current source for transistors 300 and 301. Since it is desired to detect noise pulses with amplitudes greater than the synchronizing pulse amplitude, and the input video signal has negative-going synchronizing pulses, transistor 300 is biased at a reference level, $V_4$, equal to or less positive than the amplitude of the synchronizing pulses. When a noise pulse occurs at the base of transistor 301, transistor 301 turns off and transistor 300 turns on. When transistor 300 turns on, transistors 305 and 306 conduct to provide noise suppression signals to the respective circuits connected thereto.

FIG. 7 is another preferred embodiment of a control circuit 32 for a video system in accordance with the invention. The circuit of FIG. 7 differs from that of FIG. 2 by deriving the automatic contrast control feedback signal from video driver 30 rather than from high voltage circuit 20. In FIG. 7 components the same as those in FIG. 3 are numbered the same.

The output or tap of variable resistor 81 in contrast control 31 is connected via series connected resistors 320, 321, and 322 to the base and collector of transistor 90 and to the base of transistor 102. A junction 323 between resistors 320 and 321 is connected to circuit ground by a filter capacitor 324, while the junction between resistors 321 and 322 is connected to circuit ground by a filter capacitor 325. These components replace resistors 86, 91, and 92 and diode 87 and capacitors 95 and 100 of FIG. 3.

The collector of transistor 133 in video driver 30 is connected by a capacitor 326 to circuit ground and to a base of a transistor 327. A collector of transistor 327 is connected to junction 323 and an emitter is connected by a resistor 330 to the tap of variable resistor 81 and by a parallel connected resistor 331 and capacitor 332 to circuit ground.

In operation, current flows from the tap of variable resistor 81 via resistors 320, 321, and 322 to transistors 90 and 102 to control the gain of video attenuator 26 as was described in connection with FIG. 3. The signal at the collector of transistor 133 has positive-going white level. Capacitor 325 filters or rolls-off the white-going pre-shoots, over-shoots, and noise. The relatively lower frequency white peaks are coupled to the base of transistor 327. The voltage at the tap of variable resistor 81 is coupled across resistors 330 and 331 to establish a reference level at the emitter of transistor 327. If the positive-going white peaks at the base of transistor 327 exceed the emitter reference voltage by 0.7 volts, transistor 327 will turn on to discharge capacitor 324. When capacitor 324 is discharged, the amount of current flowing to transistors 90 and 102 decreases to decrease the gain of video attenuator 26 which decreases the white peaks at the collector of transistor 133. Thus, excessive white peaks in the video signal are detected by transistor 327 to cause the contrast to be reduced.

The reference voltage at the emitter of transistor 327 tracks the setting of variable resistor 81 to track the contrast level selected by the viewer. Thus, the automatic contrast control provides a range of automatic control regardless of the contrast control setting. That is, if the viewer selects a lower contrast setting, peak detecting transistor 327 detects correspondingly lower white peaks.

The embodiment of FIG. 7 also includes beam current limiting. The return end of secondary winding 93 remote from high voltage circuit 20 is connected by a resistor 333 to source $V_S$ and by a capacitor 334 to circuit ground. A diode 335 is connected in parallel with capacitor 334. Junction 323 is connected by a resistor 336 in series with a diode 337 to the junction of winding 93 and resistor 333.

Excessive beam current drawn by CRT 17 through high voltage circuit 20 and winding 93 decreases the voltage across capacitor 334 to forward bias diode 337. When diode 337 is forward biased, the contrast control current flowing through resistor 321 is reduced to reduce the contrast by decreasing the gain of video attenuator 26. If sufficient excessive current is drawn by CRT 17, the contrast will be reduced to minimum. During normal operation, however, diode 337 is reverse biased and the beam current limiter is disconnected from control circuit 32. Diode 335 prevents excessive current drain from control circuit 32 which might otherwise damage the various circuit components connected thereto.

Accordingly, the preferred embodiment of a video processing system in accordance with the invention has been shown and described. A video processing system in accordance with the invention possesses numerous advantages over prior art video processing systems. Those advantages include a video processing system with a DC controlled aperture corrector, automatic peaking, automatic contrast control and beam current limiting, common blanking and noise protection circuitry for the various functions in the video processing system, and improved black level control circuitry. In addition, the automatically controlled aperture correction signal is combined with the video signal prior to application to the gain controlled stage so that the aperture correction signal is attenuated by the same amount as the video signal. Furthermore, the black level is controlled at the output of the video system subsequent to automatic contrast control and aperture correction to provide optimum adjustment and automatic control of the various video signal levels.

As was indicated previously, the preferred form of fabrication of a video processing system is in integrated circuit form. A video processing system in accordance with the invention is advantageously arranged so that a minimum number of external connections are required thereby increasing reliability and reducing cost. For example, the video signal input to video amplifier 25, aperture corrector 40, and noise separator 45 requires only one input pin to the integrated circuit. Similarly, the output of peaking detector 43 at the collector of transistor 270 and the control input to aperture corrector 40 only require one pin on the integrated circuit. Also, a pin is saved by combining the automatic contrast feedback with the DC contrast control.

While there has been shown and described what are at present considered the preferred embodiments of the invention it will be obvious to those skilled in the art that various changes and modifications may be made therein without departing from the invention as defined by the appended claims.

What is claimed is:

1. A video processing system for a television receiver comprising:
   a gain controlled stage having a video signal input and a gain control input;
   means connected to said video signal input for providing a video signal to said gain controlled stage;
   aperture correction means connected to said means for providing a video signal and to said video signal input of said gain controlled stage for providing an aperture correction signal to said video signal input;
   gain control means connected to said gain control input of said gain controlled stage for providing a gain control signal thereto for causing said gain controlled stage to alter the amplitude of said video signal and said aperture correction signal by an amount determined by said gain control signal;
   an amount stage connected to said gain controlled stage for receiving a combined video signal and aperture correction signal therefrom; and
   black level control means connected to said output stage for detecting the black level of the video signal provided by said output stage and for providing a control signal to said output stage in response to the detected black level.

2. A video processing system as defined in claim 1 wherein said television receiver includes a cathode ray tube and a high voltage circuit connected thereto, and wherein said gain control means includes automatic control means connected to said high voltage circuit for automatically altering the gain of said gain controlled stage in response to the beam current of said cathode ray tube.

3. A video processing system as defined in claim 1 wherein said gain controlled stage includes first and second transistors having different collector load resistances and the gain of said gain controlled stage is controlled by controlling the relative conduction of said first and second transistors, said means for providing a video signal and said aperture correction means are connected to the emitters of said first and second transistors, the collector of said second transistor is connected to said output stage, and said gain control means provides a differential gain control signal to the bases of said first and second transistors; and said gain controlled stage further includes a third transistor having a base connected to the base of said first transistor and a collector connected to the collector of said second transistor and a fourth transistor having a base connected to the base of said second transistor and a collector connected to the collector of said first transistor, said third and fourth transistors for holding the black level of the video signal at the collector of said second transistor relatively constant over variations of said gain control signal.

4. A video processing system as defined in claim 1 wherein said aperture correction means includes an aperture correction stage connected to said means for providing a video signal and to said video signal input of said gain controlled stage, a variable bias means connected to said aperture correction stage for controlling the gain thereof, and automatic control means connected to said aperture correction stage and to said variable bias means for automatically controlling the amplitude of said aperture correction signal in response to a bias provided by said variable bias means and in response to the amplitude of said aperture correction signal.

5. A video processing system as defined in claim 1 wherein said black level control means includes a charge storage capacitor, means for charging said capacitor, and means for discharging said capacitor during black intervals of said video signal; and said television receiver includes a deflection circuit and a blanking circuit connected thereto and to said black level control means for disabling said means for discharging said capacitor during retrace intervals except for the residual portions of the blanking pulses contained in said video signal, said means for charging and discharging said capacitor having time constants proportioned to average said residual portions of the blanking pulses with trace interval signals of said video signal.

6. A video processing system as defined in claim 5 wherein said black level control means includes comparing means connected to said output stage and to said means for discharging said capacitor for comparing a portion of the video signal from said output stage to a reference, said black level control means further including an adjustable control for altering said portion of the video signal from said output stage.

7. A video processing system for a television receiver comprising:
   a video amplifier for amplifying a video signal having video intervals and blanking intervals, said blanking intervals having a signal level corresponding to the black level of the video intervals;

a blanking circuit for providing blanking pulses during said blanking intervals of said video signal;

comparing means connected to receive a reference voltage and a portion of the video signal from said video amplifier, and further connected to a control input of said video amplifier for providing a black level control signal to said control input in response to the relative amplitudes of said reference voltage and said portion of the video signal; and means connecting said blanking circuit to said comparing means for disabling said comparing means during said blanking intervals except for residual portions of said blanking intervals, said comparing means averaging said residual portions of said blanking intervals with video signals occurring during said video intervals.

8. A video processing system as defined in claim 7 wherein comparing means includes a charge storage capacitor connected to said control input, means for charging said capacitor, and means for discharging said capacitor in response to black level signals during said video intervals and in response to said residual portions of said blanking intervals.

9. A video processing system as defined in claim 8 wherein said comparing means includes an adjustable control for altering said portion of said video signal to alter said black level control signal.

10. A video processing system for a television receiver comprising:

a gain controlled stage having a video signal input and a gain control input;

means connected to said video signal input for providing a video signal to said gain controlled stage;

an aperture correction stage connected to said means for providing a video signal and to said video signal input of said gain controlled stage for providing an aperture correction signal to said video signal input;

a variable bias means connected to said aperture correction stage for controlling the gain thereof;

automatic control means connected to said aperture correction stage and to said variable bias means for automatically controlling the amplitude of said aperture correction signal in response to a bias provided by said variable bias means and in response to the amplitude to said aperture correction signal;

gain control means connected to said gain control input of said gain controlled stage for providing a gain control signal thereto;

an output stage connected to said gain controlled stage for receiving a combined video signal and aperture correction signal therefrom; and black level control means connected to said output stage for detecting the black level of the video signal provided by said output stage and for providing a control signal to said output stage in response to the detected black level.

11. A video processing system as defined in claim 10 wherein said television receiver includes a cathode ray tube and a high voltage circuit connected thereto, and wherein said gain control means includes automatic control means connected to said high voltage circuit for automatically altering the gain of said gain controlled stage in response to the beam current of said cathode ray tube.

12. A video processing system as defined in claim 10 wherein said gain controlled stage includes first and second transistors having different collector load resistances and the gain of said gain controlled stage is controlled by controlling the relative conduction of said first and second transistors, said means for providing a video signal and said aperture correction stage are connected to the emitters of said first and second transistors, the collector of said second transistor is connected to said output stage, and said gain control means provides a differential gain control signal to the bases of said first and second transistors; and said gain controlled stage further includes a third transistor having a base connected to the base of said first transistor and a collector connected to the collector of said second transistor and a fourth transistor having a base connected to the base of said second transistor and a collector connected to the collector of said first transistor, said third and fourth transistors for holding the black level of the video signal at the collector of said second transistor relatively constant over variations of said gain control signal.

13. A video processing system as defined in claim 10 wherein said black level control means includes a charge storage capacitor, means for charging said capacitor, and means for discharging said capacitor during black intervals of said video signal, and said television receiver includes a vertical deflection circuit and a blanking circuit connected thereto and to said black level control means for disabling said means for discharging said capacitor during vertical retrace intervals except for residual portions of the vertical blanking pulses contained in said video signal, said means for charging and discharging said capacitor having time constants proportioned to average said residual portions of the vertical blanking pulses with trace interval signals of said video signal.

14. A video processing system as defined in claim 13 wherein said black level control means includes comparing means connected to said output stage and to said means for discharging said capacitor for comparing a portion of the video signal from the output stage to a reference, said black level control means further including an adjustable control for altering said portion of the video signal from said output stage.

15. A video processing system as defined in claim 10 including a noise detector connected to a source of reference voltage and to said means for providing a video signal for providing pulses in response to noise pulses contained in said video signal, said noise detector further including output means connected to said black level control means and to said automatic control means for coupling said pulses in response to noise pulses thereto.

* * * * *

UNITED STATES PATENT AND TRADEMARK OFFICE
CERTIFICATE OF CORRECTION

PATENT NO. : 4,110,790
DATED : August 29, 1978
INVENTOR(S) : Robert C. Wheeler

It is certified that error appears in the above-identified patent and that said Letters Patent are hereby corrected as shown below:

Col. 2, line 41 - Delete "ths" and insert -- this --.

Col. 9, line 6 - Delete "81" and insert -- 80 --.

Col. 9, line 20 - Delete "81" and insert -- 91 --.

Col. 12, line 34 - Delete "31" and insert -- 131 --.

Col. 14, line 64 - Delete "146" and insert -- 46 --.

Col. 25, line 59 - Delete "amount" and insert -- output --.

Signed and Sealed this

Thirteenth Day of March 1979

[SEAL]

Attest:

RUTH C. MASON
*Attesting Officer*

DONALD W. BANNER
*Commissioner of Patents and Trademarks*